(12) United States Patent
Holmquist et al.

(10) Patent No.: US 9,000,777 B2
(45) Date of Patent: Apr. 7, 2015

(54) SYSTEM TO MEASURE TIME OF ARRIVAL AND THICKNESS OF ROTOR BLADES VIA MICROWAVE ENERGY

(75) Inventors: Eric B. Holmquist, South Windsor, CT (US); Peter L. Jalbert, Granby, CT (US); Richard E. Versailles, New Hartford, CT (US)

(73) Assignee: Hamilton Sunstrand, Windsor Locks, CT (US)

( * ) Notice: Subject to any disclaimer, the term of this patent is extended or adjusted under 35 U.S.C. 154(b) by 1245 days.

(21) Appl. No.: 11/302,923

(22) Filed: Dec. 14, 2005

(65) Prior Publication Data

US 2007/0132461 A1    Jun. 14, 2007

(51) Int. Cl.
*G01R 27/04*   (2006.01)
*F01D 17/02*   (2006.01)
*F01D 21/00*   (2006.01)
*G01H 1/00*    (2006.01)

(52) U.S. Cl.
CPC ............. *F01D 17/02* (2013.01); *F01D 21/003* (2013.01); *G01H 1/006* (2013.01); *F05D 2260/80* (2013.01)

(58) Field of Classification Search
USPC ......................................... 324/637, 642, 644
See application file for complete search history.

(56) References Cited

U.S. PATENT DOCUMENTS

| | | | |
|---|---|---|---|
| 3,502,967 A * | 3/1970 | Bridges et al. | 324/226 |
| 4,060,329 A | 11/1977 | Ellis | |
| 4,080,823 A * | 3/1978 | Stargardter | 73/655 |
| 4,326,804 A | 4/1982 | Mossey | |
| 4,359,683 A | 11/1982 | Chivers | |
| 4,384,819 A | 5/1983 | Baker | |
| 4,842,477 A | 6/1989 | Stowell | |
| 4,887,468 A * | 12/1989 | McKendree et al. | 73/660 |
| 4,896,537 A | 1/1990 | Osborne | |
| 4,922,757 A | 5/1990 | Rozelle et al. | |
| 5,015,949 A | 5/1991 | Koch et al. | |

(Continued)

FOREIGN PATENT DOCUMENTS

| | | |
|---|---|---|
| FR | 2714171 A1 | 6/1995 |
| GB | 1147737 | 4/1969 |

(Continued)

OTHER PUBLICATIONS

Frank Weidmann, "The Six-Port Reflectometer," http://www.geocities.com/frank_weidmann/sixport.html, Nov. 29, 2004.

R. Grzybowski, G. Foyt, W. Atkinson, H. Knoell, and J. Wenger; "Microwave Blade Tip Clearance Measurement System;" pp. 1-6, 1996.

(Continued)

*Primary Examiner* — Benjamin M Baldridge
(74) *Attorney, Agent, or Firm* — Carlson, Gaskey & Olds, P.C.

(57) ABSTRACT

A rotor blade measurement system includes a microwave source and a probe. A directional coupler is attached to the source and the probe. A detector is attached to the directional coupler. The probe directs a microwave signal toward a rotor such that during rotation the rotor blade will pass through the path of the microwave signal. As the rotor blade passes the microwave signal is reflected back to the probe. The directional coupler separates the original microwave signal and the reflected signal. The detector then determines the energy level of the reflected signal. As each rotor blade passes the microwave signal it generates a reflected signal that can be analyzed over time. From the length and shape of the waveform of the reflected signal the amount of twisting and flutter in a rotor blade can be determined.

7 Claims, 5 Drawing Sheets

(56) References Cited

U.S. PATENT DOCUMENTS

| | | | |
|---|---|---|---|
| 5,043,703 | A | 8/1991 | Dipoala et al. |
| 5,479,826 | A * | 1/1996 | Twerdochlib et al. .......... 73/660 |
| 5,511,426 | A * | 4/1996 | Clement et al. ................ 73/655 |
| 5,818,242 | A | 10/1998 | Grzybowski et al. |
| 6,489,917 | B2 | 12/2002 | Geisheimer et al. |
| 6,833,793 | B2 | 12/2004 | Dzieciol et al. |
| 6,856,281 | B2 | 2/2005 | Billington et al. |
| 7,095,221 | B2 * | 8/2006 | Bosselmann et al. ........ 324/71.1 |
| 7,341,428 | B2 * | 3/2008 | Twerdochlib .................... 416/1 |
| 2005/0264275 | A1 | 12/2005 | Bosselmann et al. |

FOREIGN PATENT DOCUMENTS

| | | |
|---|---|---|
| GB | 1277748 | 6/1972 |
| GB | 2 063 001 | 5/1981 |
| GB | 2 065 410 | 6/1981 |
| GB | 2 344 177 | 5/2000 |
| JP | 10-68617 | 5/1989 |
| WO | 95/35484 | 12/1995 |
| WO | WO 0244751 | 6/2002 |

OTHER PUBLICATIONS

Seoktae Kim and Cam Nguyen, "A Displacement Measurement Technique Using Millimeter-Wave Interferometry;" IEEE Transactions on Microwave Theory and Techniques, vol. 51, No. 6, Jun. 6, 2003.

"A Microwave Position Sensor with Sub-Millimeter Accuracy", Institutsbericht 1995-1999; http://www.ime.jku.at/projects/project2.shtml.

Ken Gentile, "Fundamentals of Digital Quadrature Modulation," www.rfdesign.com, Feb. 2003.

http://www.osti.gov/energycitations/product.biblio.jsp?osti_id=5131992, Edwards, D.F., Baumeister, P. Nov. 15, 1981.

M. Brady 1964 J. Sci. Instrum. 41 440-444, "Three Port Tuned Microwave Reflectometer", http://www.iop.org/EJ/abstract/0950-7671/41/7/307/.

"Radar and Radio Aids to Navigation," pp. 1032-1037.

European Search Report for EP Application No. 06256306.9, Jun. 2, 2010.

* cited by examiner

SYSTEM TO MEASURE TIME OF ARRIVAL AND THICKNESS OF ROTOR BLADES VIA MICROWAVE ENERGY

BACKGROUND OF THE INVENTION

The invention is a system and method for measuring rotor blade movement in a turbine engine. More particularly, for measuring the arrival time and thickness of a rotor blade during engine operation.

During operation of a gas turbine engine, rotor blades are placed under stress by the operating environment. To best maintain the engine in proper operational condition, the rotor blades are monitored to detect any weakening over time. Specifically, the vibration modes of the rotor blades are monitored to expose any twisting and vibrations, or flutter, of the blades during engine operation.

However, known monitoring equipment have difficulties withstanding the heat of the turbine engine environment. Thus, measuring the vibration modes of rotor blades is difficult in sections of the turbine engine that operate under high temperatures. Known methods of measuring vibration modes involve using optical sensors or eddy current sensors. These methods have a disadvantage since the measurements and testing may only take place at cooler temperatures that may not accurately represent the rotor blades during actual engine operation. As a result of not being able to measure vibration modes during engine operation the system is reliant on an operator or mechanic to schedule routine testing of the rotor blades.

Additionally, known systems measure the vibrations modes of the rotor blades by monitoring the passage of a blade. Passage of the blade provides information regarding flutter. However, additional data is desirable to calculate the twisting of the rotor blades. In the prior art, multiple probes must be placed along the chord of the blade to provide the data needed.

Reflected signals have been utilized in analyzing turbine blades, but not for vibration analysis.

An arrangement and method for measuring vibration modes of rotor blades during operation of a turbine engine is needed.

SUMMARY OF THE INVENTION

A rotor blade measurement system includes a microwave source and a probe. The probe directs a microwave signal toward a rotor such that during rotation the rotor blade will pass through the path of the microwave signal. As the rotor blade passes, the microwave signal is reflected back to the probe. A directional coupler and detector are attached to the source and the probe. The directional coupler separates the original microwave signal and the reflected signal. The detector then determines the energy level of the reflected signal.

As each rotor blade passes through the microwave signal, a reflected signal is generated and its energy level is measured over time. The arrival of the rotor blade is indicated by a rise in the energy level of the reflected signal above a threshold. The departure of the rotor blade is indicated by a decrease in the energy level of the reflected signal below a threshold.

Twisting of the rotor blades can be detected when the reflected signals have a shift in perceived width. The perceived width of the rotor blade can be determined by the length of time over which the energy level of the signal reflected back to the probe exceeds a threshold. From the length and shape of the reflected signal the amount and direction of twisting in a rotor blade can be determined.

Another common vibration mode in rotor blades is flutter. Flutter is vibration of the rotor blade during rotation of the rotor. The arrival time of a rotor blade at a specific point is shown by even intervals between the beginnings of the reflected signals. When the rotor blade flutters the point in time the reflected signal begins varies. By observing the difference between the expected signal arrival and the actual signal arrival the amplitude and frequency of the flutter can be calculated.

These and other features of the present invention can be best understood from the following specification and drawings, the following of which is a brief description.

DETAILED DESCRIPTION OF THE PREFERRED EMBODIMENT

Figure 1:
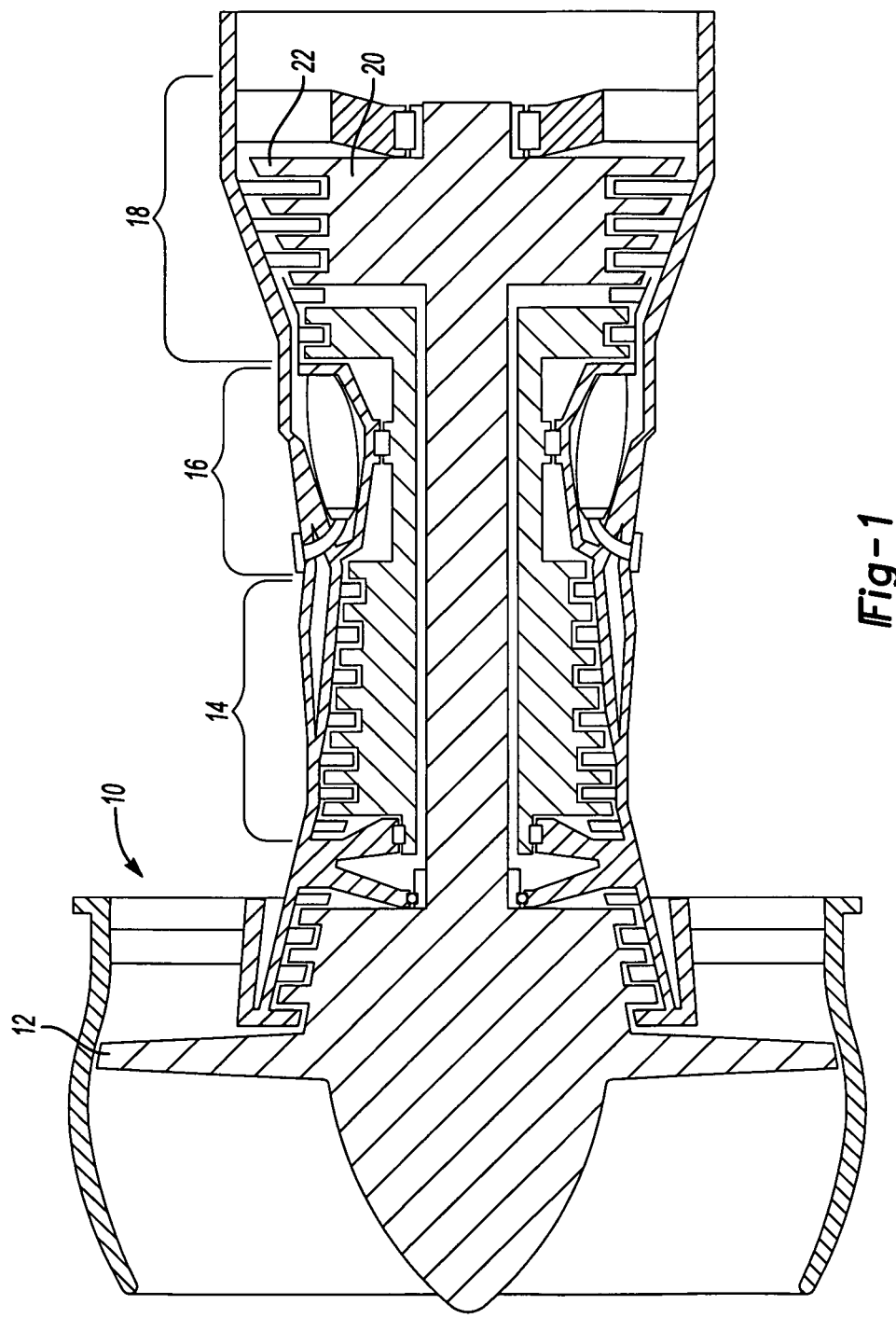
FIG. 1 is schematic view of a turbine engine.

FIG. 1 shows a gas turbine engine 10. The turbine engine 10 has a fan 12, a compressor 14, a combustion chamber 16 and a turbine 18. The fan 12 pulls air into the engine 10. The air is compressed within compressor 14 and then mixes with fuel and is burned within the combustion chamber 16. When combustion occurs the air rapidly expands creating thrust where it is driven out the rear of the engine 10 by turbine 18. The turbine 18 includes a rotor 20 which rotates as the gas stream exits the rear of the engine 10. The rotation of the rotor 20 drives the fan 12 and compressor 14. Because the rotor 20 is located directly behind the combustion chamber 16 the air passing over the rotor 20 is at a high temperature. The rotor 20 has rotor blades 22 that rotate about the center of the engine 10. The vibration modes of the rotor blades 22 can be monitored to determine if there is any twisting or flutter occurring during operation.

Figure 2:
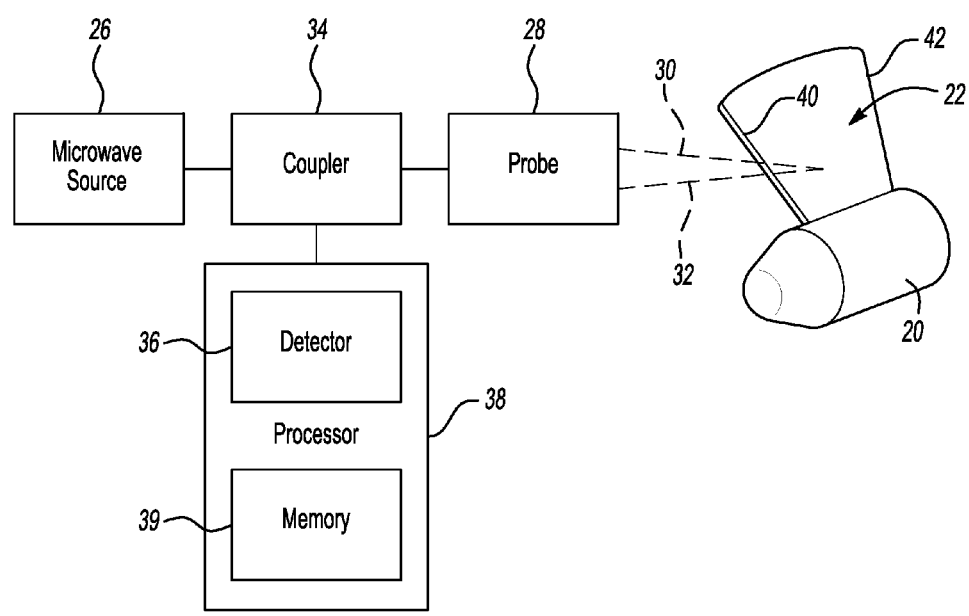
FIG. 2 a schematic view of one embodiment of a rotor measurement system of the present invention.

FIG. 2 shows schematic illustration of a rotor blade measurement system of the present invention. A microwave source 26 and a probe 28 are placed within the engine 10. The probe 28 directs a microwave signal 30 from the microwave source 26 such that the rotor blade 22 will pass the path of the microwave signal 30 during rotation of the rotor 20. The probe 28 can direct the microwave signal 30 over a distance. Therefore the probe 28 requires a direct line of sight to the rotor blades 22 as they rotate. In order to achieve a direct line of sight the probe 28 must be located in the area of turbine 18. Contrary to the prior art, the probe 28 can withstand the high temperature area of the turbine 18 without damage. The probe 28 may be located anywhere in the engine 10 that provides a direct line of sight between the probe 28 and the rotor blades 22.

The probe 28 sends out the microwave signal 30. As the rotor 20 rotates the rotor blade 22 pass through the microwave signal 30 and a reflected signal 32 is sent back to the probe 28. A processor 38 contains a detector 36, and may also include a memory storage device 39. A directional coupler 34 separates the original microwave signal 30 and the reflected signal 32. The detector 36 then determines the energy level of the reflected signal 32. The processor 38 uses the data from the coupler 34 and detector 36 to process the information and determine the stresses on the rotor blade 22. The memory storage device 39 may record the information from the detector 36, or may record the microwave signal 30 and reflected signal 32 for later analysis.

Figure 3A:
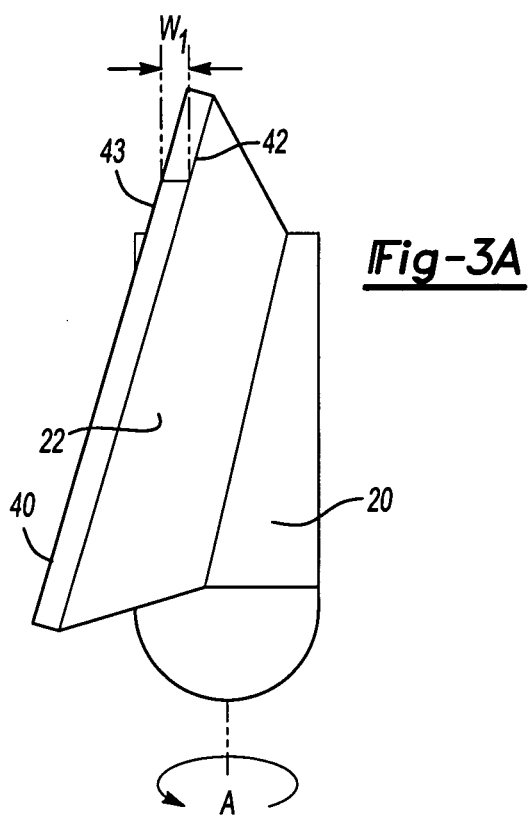
FIG. 3A is a perspective view of a rotor blade assembly under normal conditions.
Figure 3B:
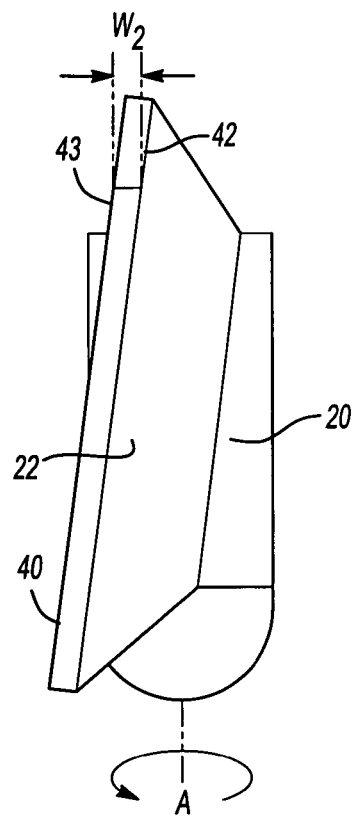
FIG. 3B is a perspective view of a rotor blade assembly where the rotor blade is twisting in a counter-clockwise direction due to stress.
Figure 3C:
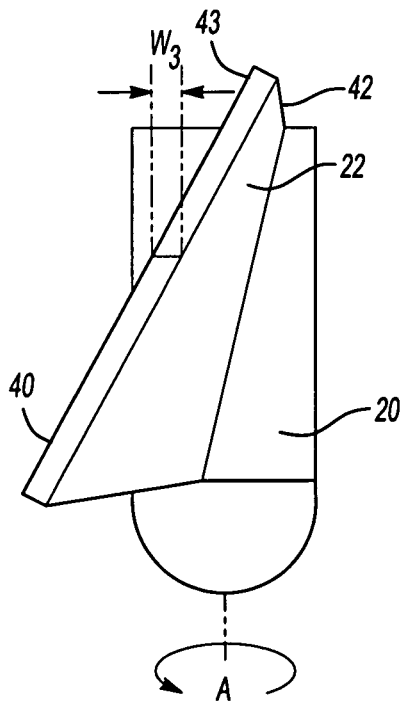
FIG. 3C is a perspective view of a rotor blade assembly where the rotor is twisting in a clockwise direction due to stress.

FIG. 3A illustrates a rotor 20 having a rotor blade 22. The rotor 20 shown is not under stress, such as, when the engine is not operating. The width of a surface 43 of the rotor blade 22 under normal stress is illustrated as $w_1$. FIG. 3B shows a rotor 20 where a rotor blade 22 is twisting in a counter-clockwise direction. The twisting results in the rotor blade 22 having a lesser perceived width, illustrated by $w_2$. As can be seen the width $w_2$ appears smaller than the width $w_1$. The probe 28 (shown in FIG. 2) is positioned in a location that allows for the microwave signal 30 to reflect off the surface 43 of the rotor blade 22, such as the point of view shown in FIGS. 3A-3B. When the probe 28 sends out the microwave signal 30 the smaller width $w_2$ causes the signal 30 to reflect back to the probe 28 for a shorter period of time. FIG. 3C illustrates that the rotor blade 22 twisting in the opposite direction of the rotor blade 22 shown in FIG. 3B. In FIG. 3C, the perceived width $w_3$ appears larger than the width $w_1$. By observing the perceived width of the surface 43 of the rotor blade 22 the amount and direction of twisting can be determined.

Figure 4:
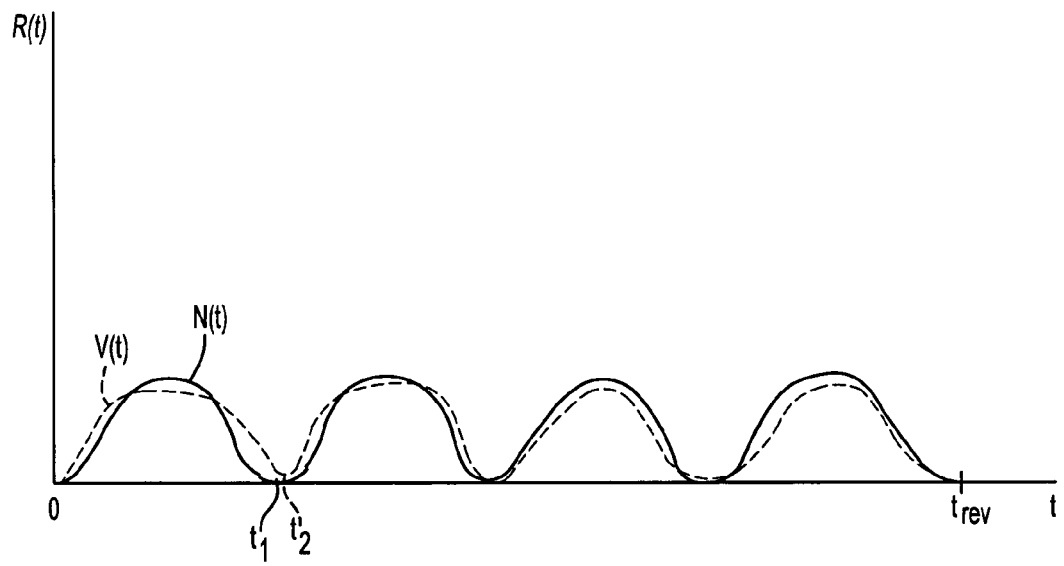
FIG. 4 is a graph showing the rotor blade activity over a selected time period as a result of twisting.

Referring to FIG. 4, a plot of the reflected signal R(t) over time is shown. A normal reflected signal N(t) illustrates the shape of a reflected signal 32 when the rotor blade 22 is not twisting or vibrating. To simplify the plot the reflected signal N(t) begins at time t=0. As the original signal 30 is sent out there is no reflection until the rotor blade 22 passes. Because no reflected signal 32 is received during that time the reflected signal 32 is essentially zero between rotor blades 22 passing. As each rotor blade 22 passes the microwave signal 30 the rotor blade 22 creates a reflected signal 32. The arrival of the rotor blade 22 is shown as the signal is reflected from a leading edge 40 (shown in FIG. 3A) of the rotor blade 22. The arrival of the rotor blade 22 is indicated by a rise in the energy level of the reflected signal 32 above a threshold, shown by an increasing slope of the line N(t). The departure of the rotor blade 22 is indicated by line N(t) decreasing below the threshold as the trailing edge 42 (shown in FIG. 3A) of the rotor blade 22 passes, shown by a decrease in slope.

A vibration mode reflected signal V(t) illustrates the shape of a reflected signal 32 when the rotor blade 22 is twisting and vibrating. The vibration mode reflected signal V(t) is illustrated as also beginning at time t=0, to simplify understanding. Both the normal and vibration mode rotors 20 are turning at the same revolutions per minute. Thus, one revolution begins and ends at the same time for each signal, indicated by $t_{rev}$. Any variations shown are a result of vibrations during rotation. The gap between the rotor blades 22 passing is illustrated where V(t) is approximately zero. A reflected signal 32 as each rotor blade 22 passes is shown by a rise and fall in the slope of V(t).

The perceived width $w_1$, $w_2$ or $w_3$ of the rotor blade 22 determines how long a signal is reflected back to the probe 28. When the rotor blade 22 twists clockwise the perceived width changes from $w_1$ to $w_3$. As can be seen in the graph the overall time $t_2$ of signal V(t) is greater than the time $t_1$ of signal N(t) due to the increase in perceived width $w_3$. When the rotor blade 22 twists in the opposite direction the perceived width changes from $w_1$ to $w_2$. This would be illustrated on the graph by a decrease in time of the signal V(t) as compared to signal N(t). Thus, from the length and shape of portion V(t) the amount and the direction of twisting in a rotor blade 22 can be determined.

Figure 5A:
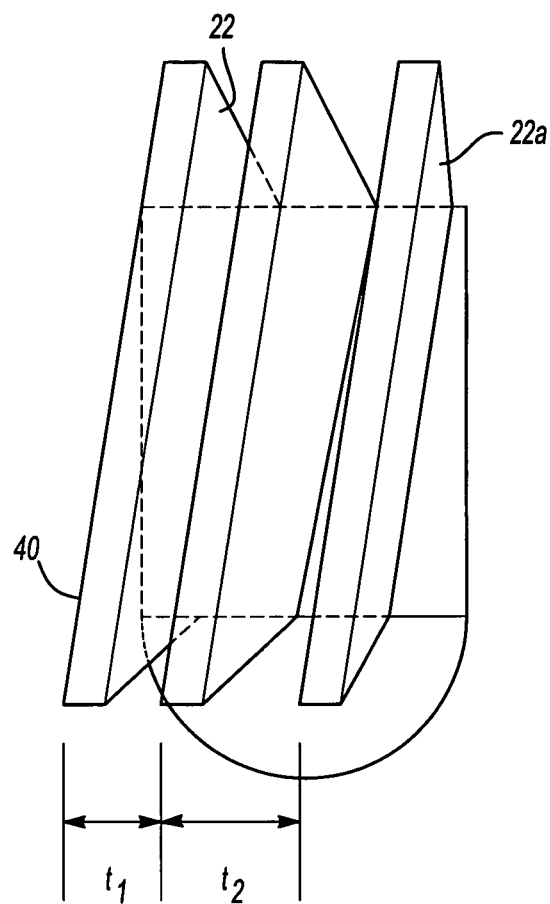
FIG. 5A is a perspective view of a rotor blade assembly where the rotor blade has moved backward during rotation due to flutter.
Figure 5B:
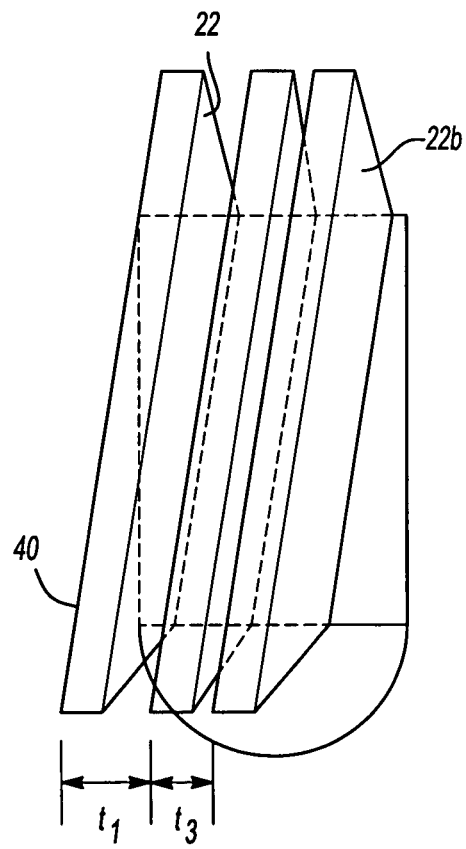
FIG. 5B is an perspective view of a rotor blade assembly where the rotor blade has moved forward during rotation due to flutter.

Referring to FIGS. 5A and 5B, another common vibration mode in rotor blades 22 is flutter. Flutter is vibration of the rotor blade 22 as the rotor 20 rotates. The arrival time of a rotor blade 22 at a specific point of rotation can be determined if the revolutions per minute of the rotor 20 is known. In FIG. 5A, the time of arrival is illustrated by measuring the arrival of surface 40 for each rotor blade 22. Any point for measuring the arrival time may be chosen so long as the same point for each rotor blade is used. The normal position of the rotor blade 22 is shown by the gap $t_1$ between one rotor blade 22 and the next. As a rotor blade 22 flutters it appears to move backward, illustrated by rotor blade 22a. The backward movement is illustrated by the longer gap $t_2$ between the rotor blade 22 and the blade 22a.

Also the rotor blade can flutter forward as shown by blade 22b in FIG. 5B. The normal position of the rotor blade 22 is shown by the gap $t_1$ between one rotor blade 22 and the next. As a rotor blade 22 flutters it appears to move forward, illustrated by rotor blade 22b. The forward movement is illustrated by the smaller gap $t_2$ between the rotor blade 22 and the blade 22b.

Figure 6:
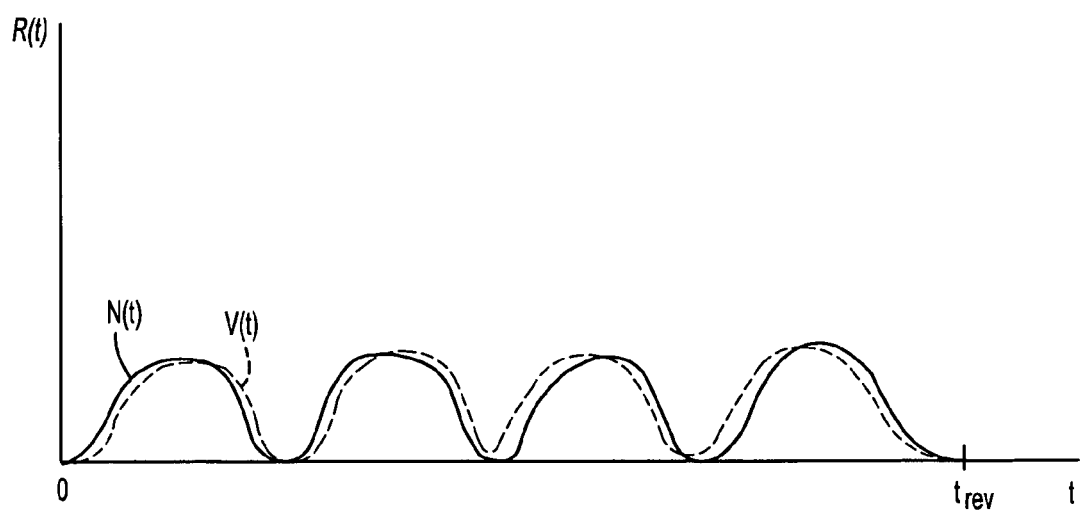
FIG. 6 is a graph showing the rotor blade activity over a selected time period as a result of flutter.

Referring to FIG. 6, a normal reflected signal N(t) illustrates the shape of a reflected signal 32 when the rotor blade 22 is not twisting or vibrating. To simplify the plot the reflected signal N(t) begins at time t=0. A vibration mode reflected signal V(t) illustrates the shape of a reflected signal 32 when the rotor blade 22 is vibrating. The vibration mode reflected signal V(t) also begins at time t=0, again for simplicity. Both the normal and vibration mode rotors 20 are turning at the same revolutions per minute. Thus, one revolution begins and ends at the same time for each signal, indicated by $t_{rev}$. Any variations shown are a result of vibrations during rotation.

In the graph, there are even intervals between the beginnings of each reflected signal 32 when the rotor blade is not fluttering. When the rotor blades 22 begin to flutter the beginning of the reflected signal 32 begins to vary although the shape of the signal remains the same. The rotor blade 22 may arrive late when the rotor blade 22 is fluttering backward as in FIG. 5A, or early if fluttering forward as in FIG. 5B. By observing the difference between the expected signal arrival and the actual signal arrival, the amplitude and frequency of flutter can be calculated.

Although the embodiment discussed discloses use of the measurement system within a turbine section 18 of a turbine engine 10 the system may also be utilized within the fan 12 and compressor 14 sections of the engine 10 as well.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A method of measuring turbine rotor blades comprising:
   a) directing an energy signal toward a rotor in a turbine engine, the rotor having a blade that includes a width;
   b) receiving a reflected energy signal from a perceived width of the blade; and
   c) analyzing the reflected energy signal over time to determine a vibration mode of the rotor corresponding to a comparison between the width and the perceived width to determine blade twist.

2. The method of claim 1, wherein said step c) includes determining an energy level of the reflected energy signal.

3. The method of claim 1, wherein said step c) also includes analyzing the energy level of the reflected energy signal over time to determine an actual arrival time of the rotor blade at a predetermined location.

4. The method of claim 3, wherein the perceived width is provided by a distance between corresponding edges of adjacent rotor blades.

5. The method of claim 4, wherein the corresponding edges is one of leading and trailing edges of the adjacent rotor blades.

6. The method of claim 1, wherein said step c) includes recording the energy signal and the reflected energy signal in a memory storage device.

7. The method of claim 1, wherein the energy signal is a microwave signal and the reflected energy signal is a reflected microwave signal.

\* \* \* \* \*